(12) United States Patent
Blasco

(10) Patent No.: US 6,443,193 B1
(45) Date of Patent: Sep. 3, 2002

(54) DEVICE FOR DISPENSING A DIVIDED SOLID MATERIAL INSIDE A RECEPTACLE

(76) Inventor: Jean-Michel Blasco, 22 rue la Bérarde, la Mede, 13220 Chateauneuf Les, Martigues (FR)

( * ) Notice: Subject to any disclaimer, the term of this patent is extended or adjusted under 35 U.S.C. 154(b) by 0 days.

(21) Appl. No.: 09/889,542
(22) PCT Filed: Jan. 20, 1999
(86) PCT No.: PCT/FR99/00113
§ 371 (c)(1), (2), (4) Date: Jan. 2, 2002
(87) PCT Pub. No.: WO00/43304
PCT Pub. Date: Jul. 27, 2000

(51) Int. Cl.[7] .................................................. B65B 1/04
(52) U.S. Cl. ....................... 141/286; 239/688; 414/301
(58) Field of Search .................. 239/688, 689, 239/684, 590.5, 553.5, 650; 141/286; 414/300, 301, 302

(56) References Cited

U.S. PATENT DOCUMENTS 1,065,960 A * 7/1913 Murray ....................... 198/360
4,397,423 A    8/1983 Beaver et al.
4,437,613 A * 3/1984 Olson .......................... 239/110

FOREIGN PATENT DOCUMENTS

| AT | 331 714 | 8/1976 |
| FR | 2 766 386 | 1/1999 |

* cited by examiner

Primary Examiner—Steven O. Douglas
(74) Attorney, Agent, or Firm—Cantor Colburn LLP

(57) ABSTRACT

This device comprises an element driven in rotation about a vertical axis, placed at an outlet of a passage used for introducing a divided solid material into a receptacle. The element comprises two conduits for dispersing the material, each having a curved shape and an opening through which the material can flow out into the receptacle. The conduits are curved about an axis perpendicular to an axis of rotation of the element but in opposite directions from one another. Each of the conduits further comprises at least one longitudinal partition extending over a length of the conduit.

19 Claims, 2 Drawing Sheets

DEVICE FOR DISPENSING A DIVIDED SOLID MATERIAL INSIDE A RECEPTACLE

FIELD OF THE INVENTION

The present invention relates to a device for dispersing a divided solid material, particularly in the form of granules or rods, inside a receptacle such as a tank.

DESCRIPTION OF THE RELATED ART

The invention finds a particularly advantageous application in the petrochemical industry, for filling reactors with catalyst material, but could be used for filling any type of receptacle with any type of divided solid material provided that the bed of material deposited in this receptacle has to be flat, uniform and/or dense, and provided that filling has to be performed with a limited emission of dust. The invention could thus, for example, be used for filling grain silos.

In the field of the petrochemical industry, it is commonplace for fluids to be treated by passing these fluids through a bed of catalyst material. This catalyst material is in the form of rods a few millimeters long placed inside the tank of the reactor which is generally of cylindrical shape.

One method of charging such a reactor consists in purely and simply tipping the catalyst material into the tank. This material does, however, have the disadvantage of depositing itself in the form of a more or less conical heap, the compaction of which is far greater in the central part than in the peripheral parts. The result of this is that the fluid to be treated tends to prefer to pass through the thinner and less dense layers, which appreciably reduces the efficiency of the reactor.

In addition, the catalyst material is frequently based on alumina, and is therefore friable and prone to breaking up. The rods of which it is made break up to some extent as they are being tipped out, which lessens the efficiency of the treatment and leads to a significant loss of material through the emission of dust.

Furthermore, the amount of material that can be placed in the reactor is reduced.

Another filling technique consists in providing, at the outlet of the conduit used for introducing the material into the tank, a dispersing head comprising plates or blades driven in rotation, which break up the stream of material.

This kind of head improves the distribution of product in the tank, without, however, making it possible to obtain a perfectly uniform bed of material. What happens is that dispersion adopts highly random paths, and the rods often reach the peripheral wall of the tank before reaching the bottom of this tank, and therefore tend to accumulate as a matter of preference at the base of this wall. The result of this is that the upper face of the bed obtained is more or less in the shape of a conical dish, also creating passages that the fluid that is to be treated prefers to take.

Furthermore, the rods strike the plates or blades, and this causes damage to them and the emission of abundant quantities of dust.

Certain problems in regulating the rate of flow of the material arise, and the density of the bed obtained is not very high.

SUMMARY OF THE INVENTION

The present invention sets out to overcome all these drawbacks by providing a dispersing device that makes it possible to deposit the material in the form of a flat, uniform bed of high density without the risk of damaging the granules or rods that make up this material, and with limited emissions of dust.

The device to which it relates comprises, in a way known per se, an element driven in rotation about a vertical axis, placed at the outlet of the duct for introducing divided solid material into the receptacle.

According to the invention, this element comprises two conduits for dispersing the material, each having a curved shape and an opening through which the material can flow out into the receptacle; these conduits are curved about one and the same axis perpendicular to the axis of rotation of said dispersing element but in opposite directions from each other, and are shaped in such a way that their outflow openings are each positioned on one side of the axis of rotation of said dispersing element, more or less in one and the same diametral plane, and are directed in opposite directions; each of these conduits furthermore comprises at least one longitudinal partition extending over all or over a large part of its length, this partition being capable of splitting the stream of material and of distributing the flow thereof, against centrifugal force, over all or over a large part of the outflow opening.

As a result their aforementioned curved shape, these conduits eliminate any impact of the material as it flows and, when the element is driven in rotation, allow the material to be sprayed out in two helical streams in opposite directions, the width of which more or less corresponds to the radius of the receptacle that is to be filled. The speed of rotation of the dispersing element may be regulated, as a function of the type of material, of the outflow speed thereof and of the distance separating this element and the bottom of the receptacle or the surface of the material, so that the granules or rods situated on the outside of these streams drop more or less to the base of the side wall of the receptacle.

A more or less flat bed of material with uniform compaction is thus obtained, without damage to the granules or rods or emission of dust.

The cross section of the conduits may be relatively small so that the two helical streams spread a relatively limited amount of this material on each revolution of said element, and the speed of rotation of said element may, by contrast, be relatively high. A bed of very high density is thus obtained without this in any way affecting the speed with which the receptacle is filled, given said speed of rotation.

As a preference, the distance between axes of two adjacent partitions increases from that part of each opening that lies on the same side as the axis of rotation of the dispersing element toward that part of the same opening that lies on the opposite side. This positioning of the partitions allows better distribution of the material within the stream emitted by the conduit.

According to a preferred embodiment of the invention, each conduit has a shape more or less in the form of half a helicoid turn. This particular shape has in the past yielded excellent results.

Advantageously, the dispersing element comprises additional means allowing the flow of the material to be regulated, such as position-adjustable plates, situated at the level of the conduits so as to increase or decrease the cross section of these conduits, or situated facing the openings of these conduits. The plates situated facing the openings of the conduits may have inclined edges capable of suitably deflecting the stream of material slightly in the vertical plane, if necessary.

As a preference, the device according to the invention comprises a system for sucking up the dust of the divided solid material, acting inside the receptacle that is to be filled and/or inside the device itself.

BRIEF DESCRIPTION OF THE DRAWINGS

For a good understanding thereof, the invention is described once again hereinbelow with reference to the appended schematic drawing which, by way of non-limiting example, depicts one preferred embodiment of the dispersion device to which it relates.

DETAILED DESCRIPTION OF THE PREFERRED EMBODIMENT

Figure 1:
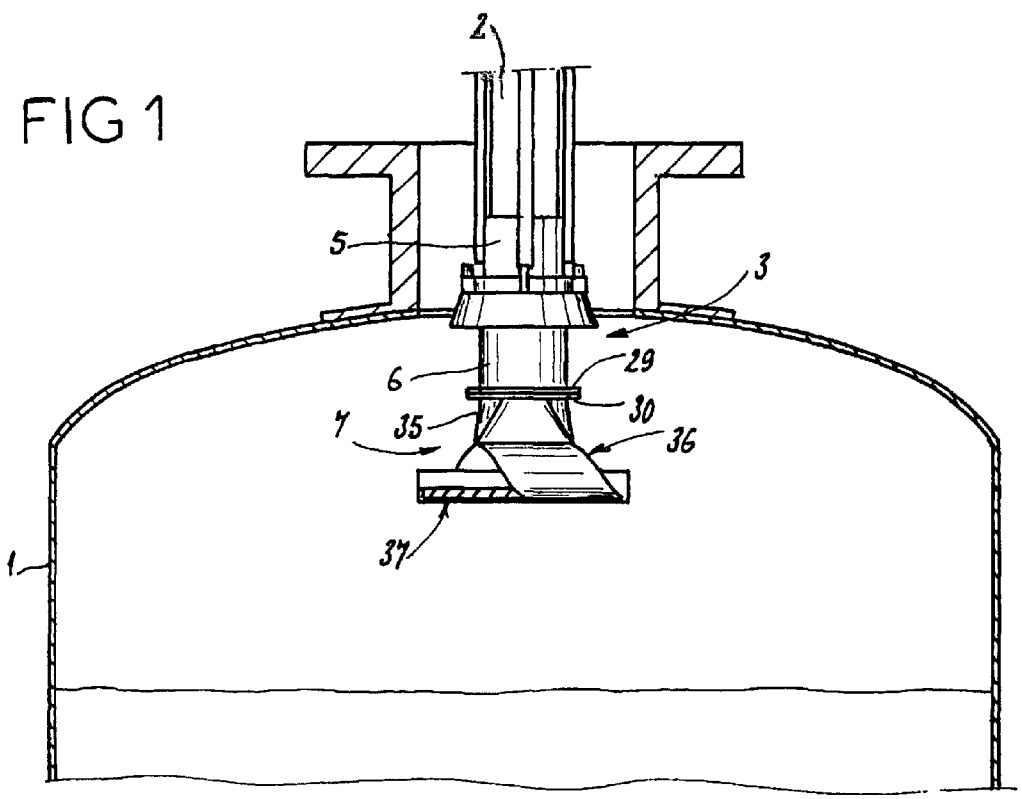
FIG. 1 is a simplified part view in longitudinal section of a reactor which can be used in the field of the petrochemical industry.

FIG. 1 depicts a reactor used in the field of the petrochemical industry to treat fluids, this treatment being performed by passing these fluids through a bed of catalyst material contained in the cylindrical tank 1 of this reactor.

This catalyst material is in the form of rods a few millimeters long and is conveyed into the tank 1 by a conduit 2.

A dispersing device 3 is placed at the outlet of the conduit 2, to distribute the catalyst material in a flat, uniform and dense bed.

Figure 2:
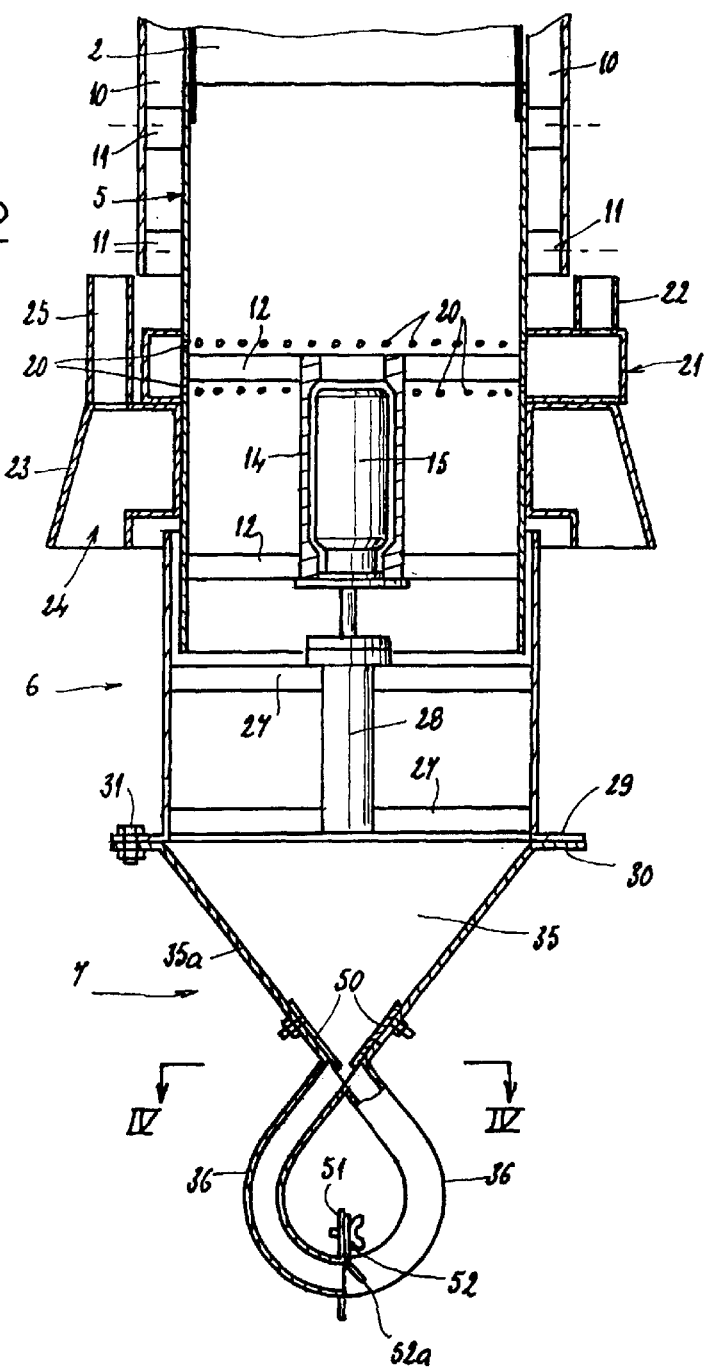
FIG. 2 is a view in longitudinal section of the device according to the invention.

As can be seen in FIGS. 1 and 2, this device 3 comprises a stationary tubular part 5, a tubular part 6 which is mounted so that it can rotate with respect to the part 5, and a dispersing element 7 mounted on the lower end of the part 6.

The part 5 is fixed to a supporting structure (not shown) by means of four U-shaped bars 10 bolted onto blocks 11 and is connected to the conduit 2. Internally, it comprises two series of four radial crossmembers 12 situated 900 apart. These crossmembers 12 are fixed to the wall of the part 5 by one of their ends and are connected by their other ends to an axial support structure 14 supporting a motor 15 that drives the rotation of the part 6.

The part 5 also comprises two series of holes 20 formed circumferentially through its wall. An annular box structure 21 is fixed to this part 5 facing these holes 20, this box structure 21 being connected to a source of vacuum by means of a hose (not shown) fitted over an end piece 22.

A second annular box structure 23 is fixed to the part 5 underneath the box structure 21. This box structure 23 has a lower annular opening 24 and is connected to a source of vacuum by means of a hose (not shown) fitted over an end piece 25.

Internally, the part 6 comprises two series of four radial crossmembers 27 situated 90° apart. These crossmembers 27 are fixed to the wall of the part 6 by one of their ends and are connected, by their ends, to an axial shaft 28 fixed to the shaft of the motor 15.

The diameter of the part 6 is greater than that of the part 5, and the assembly is shaped in such a way that the upper end of the part 6 covers the lower end of the part 5 when the shaft 28 is fixed to the shaft of the motor 15.

The lower end of the part 6 and the upper end of the element 7 each have a flange 29, 30 allowing this element 7 to be mounted on this part 6 using bolts 31.

The element 7 is hollow and comprises a primary conduit 35 which, in its lower part, splits into two secondary conduits 36.

Figure 3:
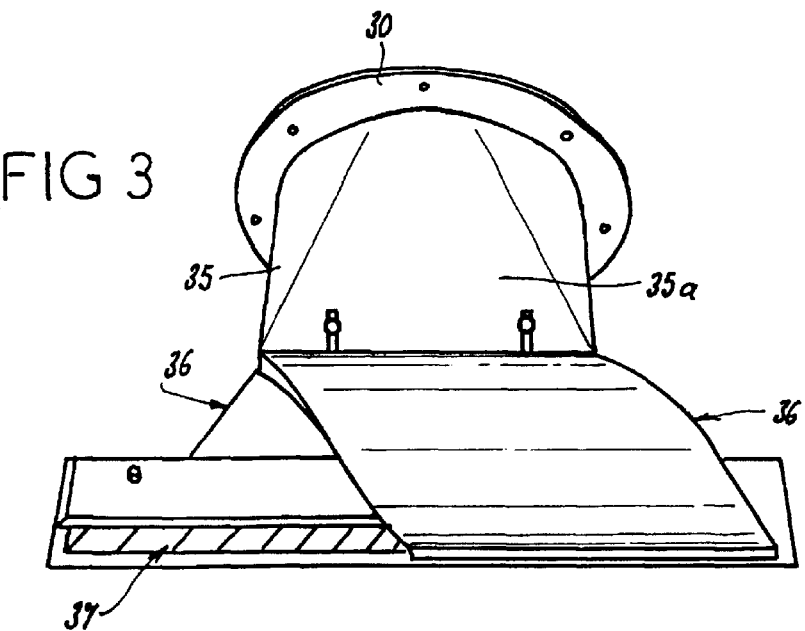
FIG. 3 is a perspective view of the dispersing element that this device comprises.

FIG. 3 more particularly shows that the primary conduit 35 changes from an opening of circular shape in its upper part to an opening of rectangular shape and of small cross section in its lower part, so that it has two opposed walls 35a which gradually flatten out toward this lower part.

Each of the secondary conduits 36 has a curved shape, more or less in the form of half a helicoid turn, and ends in an opening 37 through which material flows out into the tank 1. The half turns are wound around one and the same horizontal axis and follow on from one another in space, so that the openings 37 are each situated on one side of the axis of rotation of the element 7, in one and the same diametral plane, and are oriented in opposite directions.

Figure 4:
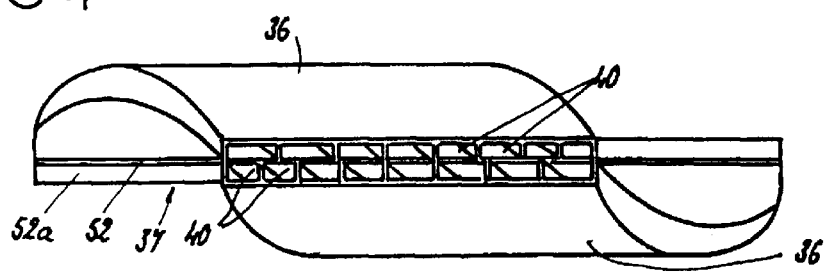
FIG. 4 is a view of this element in section on the line IV—IV of FIG. 2.

FIGS. 3 and 4 show that each of the conduits 36 internally comprises seven longitudinal partitions 40 which extend over all of its length. The distance between axes of two adjacent partitions 40 increases from that part of each opening 37 that lies on the same side as the axis of rotation of the dispersing element 7 toward that part of the same opening 37 that lies on the opposite side. In the example depicted, for a total width of each conduit 36 of 300 mm, and a height of the order of 20 mm, the distance between the side wall of the conduit 36 and the adjacent partition 40 situated closest to the axis of rotation of the element 7 is 30 mm, then, moving away from this axis of rotation, the distances between two adjacent partitions 40 are, respectively, 30 mm, 35 mm, 35 mm, 40 mm, 40 mm, and 45 mm, and the distance between the side wall of the conduit 36 and the adjacent partition 40 situated furthest toward the outside is 45 mm.

Furthermore, the two walls 35a have plates 50, the position of which can be adjusted in the direction perpendicular to the longitudinal edges of the lower opening of the conduit 35, these plates 50 making it possible to increase or to decrease the cross section for the passage of the catalyst material along the conduits 36. The position of these plates 50 is adjusted by means of slots formed in the walls 35a, of threaded rods secured to the plates 50 passing through these slots, and of nuts screwed onto these threaded rods to make it possible, depending on whether they are tightened or loosened, to prevent or to allow movement of the plates. The plates 50 cover said slots regardless of their position, which means that no product can flow out through these slots.

The conduits 36 themselves comprise vertical walls 51 placed more or less in the plane of their openings 37, along which position-adjustable plates 52 can be moved in a direction parallel to the plane of these openings 37. Position adjustment of the plates 52 is achieved in the same way as described above, using slots formed in the walls 51, threaded rods secured to these plates 52 passing through these slots, and nuts screwed onto these threaded rods to make it possible, depending on whether they are tightened or loosened, to prevent or to allow movement of the plates 52. The latter have inclined edges 52a capable of deflecting the stream of catalyst material slightly in the vertical plane, if necessary, depending on the type of material.

In practice, driving the element 7 in rotation makes it possible, by virtue of the conduits 36, for the catalyst material to be sprayed out in two helical streams in opposite directions, the width of which more or less corresponds to the radius of the tank 2.

For an element 7 situated about four meters from the bottom of the tank 2 and a tank with a diameter of about three meters, the speed of rotation of the element 7 will be about 90 revolutions per minute. This speed needs to increase by 10 to 12% when the level of the catalyst material rises by one meter.

The partitions 40 allow the stream of material to be split up and allow its flow to be distributed, against centrifugal force, over a large part or over all of the openings 37.

The conduits 36 also eliminate any impact of the material as it flows.

The plates 50, 52 make it possible to increase or to decrease the cross section of these conduits 36 so as to regulate the flow of the catalyst material, if need be.

The box structures 21, 23 themselves allow the dust from the catalyst material to be collected, both inside the tank 2 and inside the part 5.

What is claimed is:

1. Device for dispersing a divided solid material inside a receptacle, comprising an element driven in rotation about a vertical axis, placed at an outlet of a passage used for introducing the divided solid material into the receptacle, wherein the element comprises two conduits for dispersing the material, each having a curved shape and an opening through which the material can flow out into the receptacle; the conduits are curved about an axis perpendicular to an axis of rotation of said element but in opposite directions from each other, and are shaped in such a way that the openings are each positioned on one side of the axis of rotation of said element, in a diametral plane, and are directed in opposite directions; each of the conduits further comprises at least one longitudinal partition extending over a length of the conduit, the partition being capable of splitting a stream of material and of distributing a flow thereof, against centrifugal force, over the outflow opening.

2. Device according to claim 1, further comprising means for regulating a speed of rotation of the dispersing element.

3. Device according to claim 2, wherein the regulating means regulates the speed of rotation of the element as a function of at least one of factors including a type of material, an outflow speed thereof, a distance between the element and a bottom of the receptacle, and a distance between the element and a surface of the material.

4. Device according to claim 1, wherein a cross section of the conduits is relatively small so that two helical streams of material flowing out from the openings spread a limited amount of the material on each revolution of said element, and a speed of rotation of said element is, by contrast, relatively high.

5. Device according to claim 4, wherein a total width of each conduit is 300 mm and a height thereof is of an order of 20 mm.

6. Device according to claim 1, wherein a distance between axes of two adjacent partitions increases from that part of each opening that lies on a same side as the axis of rotation of the element toward that part of the same opening that lies on an opposite side.

7. Device according to claim 6, wherein, for a total width of each conduit of 300 mm, and a height of an order of 20 mm, a distance between a side wall of the conduit and an adjacent partition situated closest to the axis of rotation of the element is 30 mm, and, moving away from the axis of rotation, distances between two adjacent partitions are, respectively, 30 mm, 35 mm, 35 mm, 40 mm, 40 mm, and 45 mm, and the distance between the side wall of the conduit and the adjacent partition situated further toward an outside is 45 mm.

8. Device according to claim 1, wherein each conduit has a shape of half a helicoids turn.

9. Device according to claim 1, wherein the element comprises adjustable means for regulating the flow of the material.

10. Device according to claim 9, wherein said adjustable means comprises plates which are situated facing the openings of the conduits and have inclined edges capable of slightly deflecting the stream of material in a vertical plane.

11. Device according to claim 9, wherein the adjustable means is placed at a level of the conduits so as to increase or decrease the cross section of the conduits.

12. Device according to claim 9, wherein the adjustable means is placed facing the openings of the conduits.

13. Device according to claim 1, further comprising a system for sucking up dust of the divided solid material.

14. Device according to claim 13, wherein the system acts inside the receptacle that is to be filled and inside the device itself.

15. Device according to claim 13, wherein the system acts inside the receptacle that is to be filled or inside the device itself.

16. Device according to claim 1, wherein the divided solid material is in the form of granules or rods.

17. Device according to claim 1, wherein the receptacle is a tank.

18. Device according to claim 1, wherein the at least one longitudinal portion extends over all or a majority portion of the length of the conduit.

19. Device according to claim 1, wherein said partition is capable of distributing the flow thereof over all or a majority portion of the outflow opening.

* * * * *

UNITED STATES PATENT AND TRADEMARK OFFICE
CERTIFICATE OF CORRECTION

PATENT NO. : 6,443,193 B1  Page 1 of 1
APPLICATION NO. : 09/889542
DATED : September 3, 2002
INVENTOR(S) : Jean-Michel Blasco It is certified that error appears in the above-identified patent and that said Letters Patent is hereby corrected as shown below:

On the title page item (54), and col. 1, line 1,
after "DEVICE FOR" delete "DISPENSING" and insert therefor --DISPERSING--.

Column 3.
Line 41, after "situated" delete "900" and insert therefor --90"--.

Signed and Sealed this

Twenty-fifth Day of December, 2007

JON W. DUDAS
*Director of the United States Patent and Trademark Office*